W. H. WELCH.
RUBBER JOINT MAKING INSTRUMENT.
APPLICATION FILED FEB. 2, 1907.
1,009,002.
Patented Nov. 14, 1911.
3 SHEETS—SHEET 1.
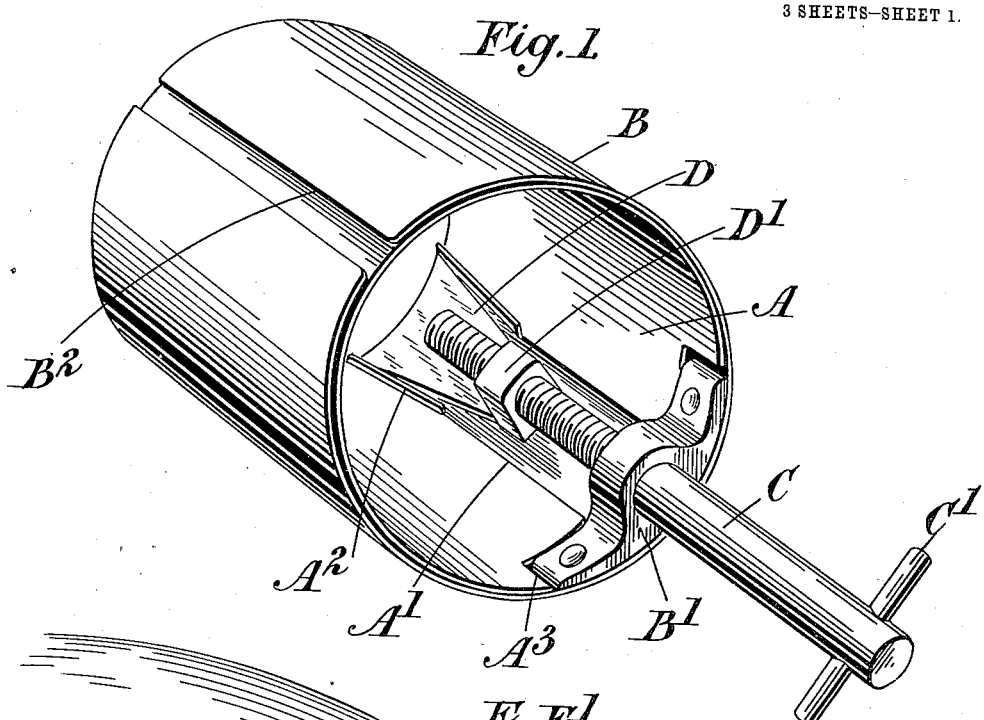
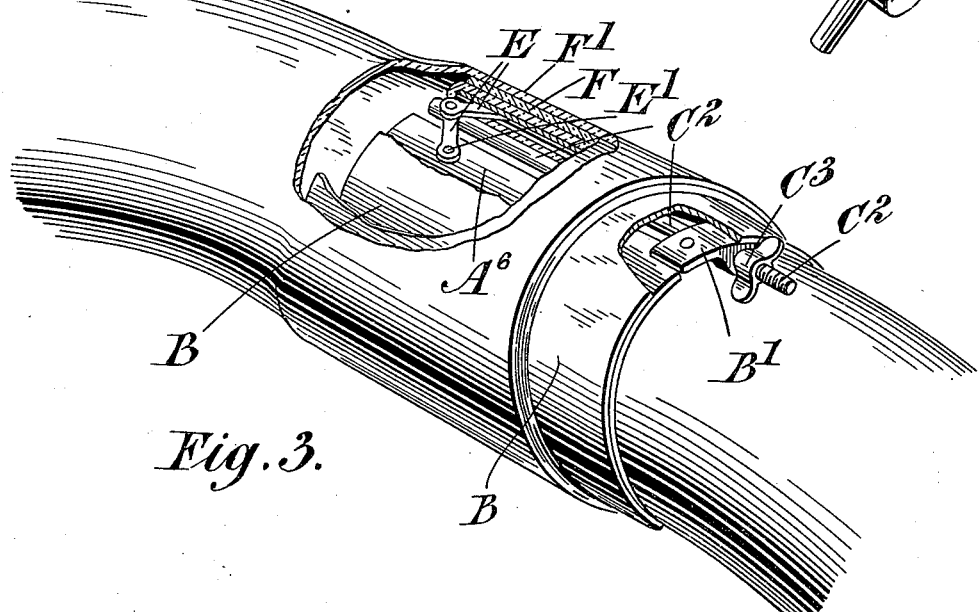
Witnesses:
Wm. Ashley Kelly
Bernard Cowen
Inventor:
Walter Henry Welch
by Henry D. Williams
Attorney.

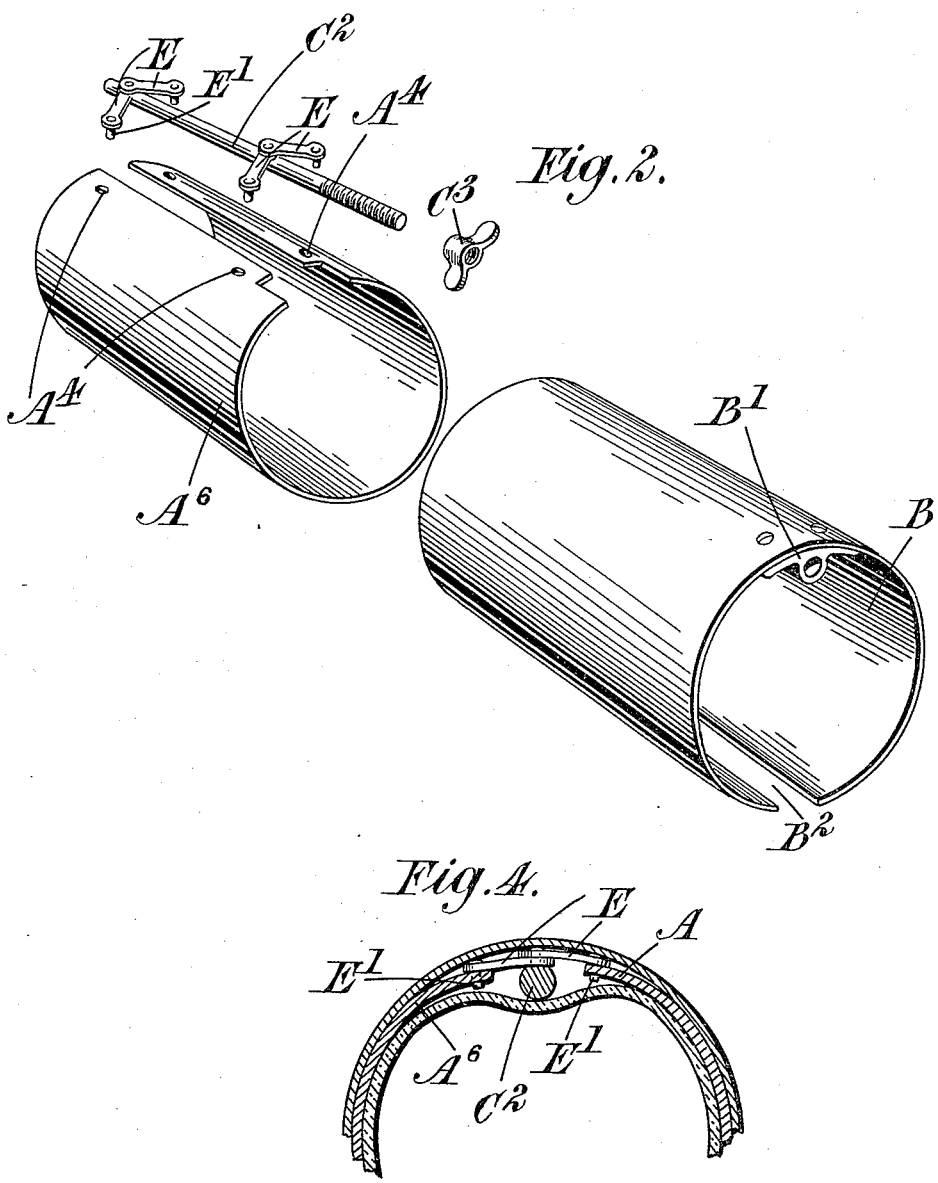

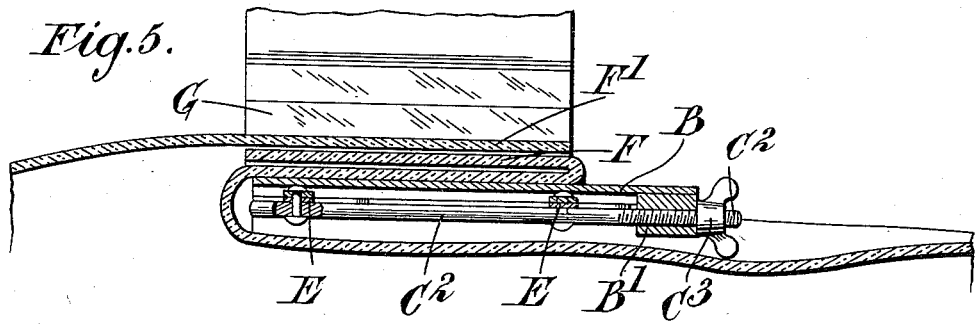
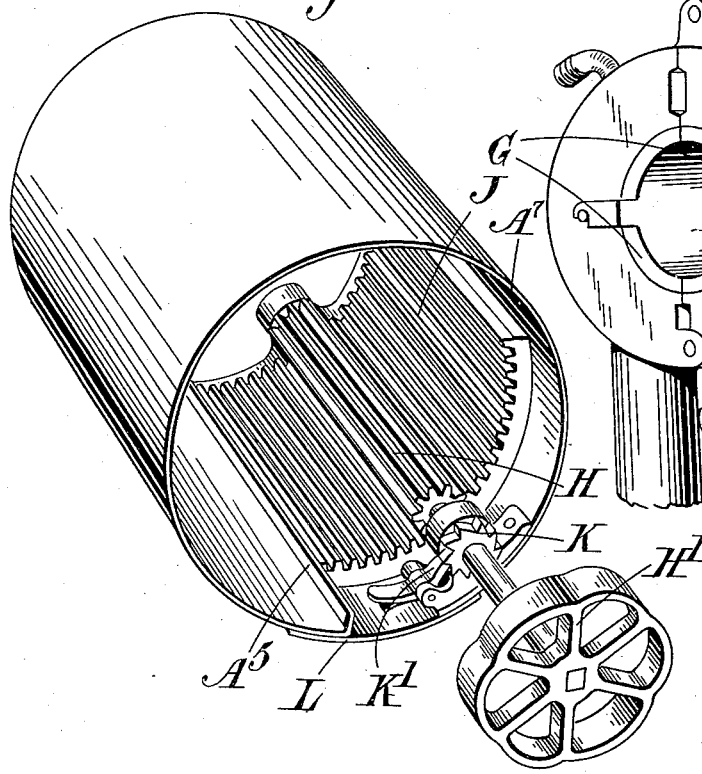
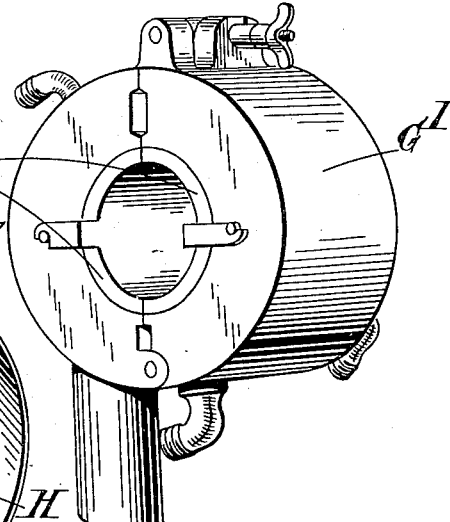

UNITED STATES PATENT OFFICE.

WALTER HENRY WELCH, OF LONDON, ENGLAND, ASSIGNOR TO HARVEY FROST & COMPANY, LIMITED, OF LONDON, ENGLAND.

RUBBER-JOINT-MAKING INSTRUMENT.

1,009,002.

Specification of Letters Patent.

Patented Nov. 14, 1911.

Application filed February 2, 1907. Serial No. 355,447.

*To all whom it may concern:*

Be it known that I, WALTER HENRY WELCH, a subject of the King of England, residing at London, in England, have invented certain new and useful Improvements in Rubber-Joint-Making Instruments, of which the following is a specification, reference being had therein to the accompanying drawings, forming a part thereof.

This invention relates to instruments used for making the joints in rubber tubes, especially those used in jointing pneumatic tires, the general object being to secure an instrument by which to make a satisfactory joint of the two ends of the tire tube whereby the tube is made into a hollow annulus. The joint may be secured in any desired manner, as by solutioning or vulcanizing, but vulcanizing is the preferable course. Hitherto when vulcanizing a joint of this kind, great difficulty has been experienced in making the two surfaces adhere satisfactorily during the vulcanizing process on account of the difficulty of obtaining satisfactory pressure inside the mold.

Therefore, a more particular object of my invention is to provide suitable means for producing such internal pressure.

Other objects and advantages of my invention will hereinafter appear.

In carrying out the present invention the necessary internal pressure is provided by means of an instrument which may be termed an expanding mandrel.

My invention includes such a mandrel in which there is left through the center of the mandrel an unobstructed passageway for the tire tube (one end of which is folded back over the outside of the mandrel, for jointing to the other end of the tire tube); and my invention further includes a construction permitting the removal of the mandrel from the closed hollow annulus of the tire tube.

My invention also includes an expanding mechanism for the mandrel.

My invention also includes several features of construction and combinations of parts, as will appear from the following description.

The instrument may comprise a length of mandrel tube, more or less approximately equal to the length of the joint. This mandrel tube is split or divided longitudinally at one side and expanding means for the mandrel tube are provided and are laterally-disposed with relation thereto so as to leave unobstructed the central aperture therein, to thereby permit the pneumatic tube to pass through the mandrel. The expanding means are engageable with and operative between the edge portions or extremities of the split mandrel tube, which are usually more or less spaced to provide room for the expanding mechanism.

In order to prevent deleterious effect upon or injuries to the rubber tube because of the comparatively large space or gap between the edges where the mandrel tube is split or divided, I prefer to inclose the expanding mandrel tube in another similar mandrel tube which is merely divided or split longitudinally so that the edges come close together. By this means when the inner mandrel tube is expanded the outer one is also expanded, but does not present the large and more or less irregular opening of the internal one, and being comparatively thin, forms, with the internal tube, a substantially outwardly smooth lap joint. In using this instrument the two ends of the rubber tube to be joined are brought together and placed one over the other in the usual manner with the necessary vulcanizing solution or other materials between them, the inner end of the tube being doubled a second time, thereby leaving an annular space in which the expanding apparatus is placed, the gaps in the two parts readily permitting both mandrel tubes to be placed on the rubber tire tube or removed therefrom after the joint is completed; or, if preferred, the expanding mandrel may be first placed upon one end of the rubber tube and the latter doubled over afterward. In order to vulcanize the joint, I prefer to employ a divided mold, steam heated or otherwise heated. This mold can be placed upon the joint and by means of the expander or mandrel, the two faces of the joint can be pressed firmly against the mold and the necessary pressure thus obtained. When the vulcanization is completed, the divided mold can be removed and the expander or mandrel also removed by taking it apart and passing the rubber through the gaps formed at the longitudinal divisions or splits in the mandrel tubes.

I shall now describe the several instruments illustrated in the accompanying drawings and embodying my invention and shall thereafter point out my invention in claims.

Figure 1 is a perspective view of one form of mandrel. Fig. 2 shows in perspective another construction with the parts separated. Fig. 3 is a perspective view of the mandrel shown in Fig. 2 with the parts in their operative position and a rubber tire tube in place, portions being broken away for clearness of illustration. Fig. 4 is a partial transverse section through the mandrel and tire tube shown in Fig. 3. Fig. 5 is a partial longitudinal section of the same. Fig. 6 is a perspective view of another modified construction of mandrel. Fig. 7 illustrates a convenient form of outer support or mold for use with the mandrel.

Like letters indicate like parts throughout the drawings, which for convenience of description will be referred to consecutively.

With reference first to Fig. 1, there is provided a non-continuous annular expansible member shown as a mandrel tube A split at $A^1$ to provide a gap and having its edges divergently separated to form a wedge-shaped opening. The mandrel tube A is shown as cut away at $A^3$ to accommodate a lug $B^1$ secured to another non-continuous annular expansible member shown as an outer mandrel tube B which encircles the inner mandrel tube A and is split at $B^2$, to provide a gap shown as diametrically opposite to the gap $A^1$ in the inner mandrel tube A. The lug $B^1$ forms a bearing for a screw-threaded rod C, the threaded portion of which engages with a tapped lug $D^1$ attached to a wedge D and forming a traveling nut. This wedge D is arranged to work in the angular opening $A^2$ in the inner mandrel tube A, the adjacent edges of which are shown as turned inward to form wedging surfaces; and rotation of the screw C by means of its handle $C^1$ will cause the wedge D to move relatively to the opening and to expand the inner tube A or allow it to contract, by reason of its own resiliency, according to the direction of the movement of the wedge. The expansion of the mandrel tube A necessarily brings about the expansion of the encircling outer mandrel tube B. It should be noted that the lug $B^1$ acts as a stop or abutment to prevent the inner mandrel tube A from moving longitudinally relatively to the tube B during the expanding operation.

In the form of construction shown in Figs. 2 to 5, inclusive, and to which the claims are more particularly directed, the expansion of the inner mandrel tube $A^6$ is brought about by means of toggle links E instead of the wedge D. These toggles are pivotally attached to a rod $C^2$ and are provided with pins $E^1$ which removably fit into holes $A^4$ in the inner tube $A^6$. In this construction the same outer split mandrel tube B may be and is shown as employed as in the construction described with reference to Fig. 1, and having the lug $B^1$ through which a projecting screw-threaded portion of the rod $C^2$ freely passes and is operable by means of a wing nut $C^3$ to thereby actuate the toggles E. Figs. 3, 4 and 5 show this form of the mandrel in its operative position. One end F of the pneumatic tube to be jointed is first passed through the mandrel and doubled over upon itself, as shown in Fig. 5. Over this doubled-over portion the other tube end $F^1$ is then placed and is surrounded by a suitable outer support, a portion of which is shown at G. This support when the joint is to be vulcanized may conveniently be of the construction illustrated by way of example in Fig. 7 where G indicates a removable liner centrally placed within a divided mold $G^1$. This mold can be heated by means of steam or otherwise as may be desired. When the joint is placed in position within the mold or other outer support with the mandrel in operative position, the expanding mechanism, such as the screw-threaded rod $C^2$ and toggle links E, is brought into action and the mandrel formed by the mandrel tubes $A^6$ and B is expanded, producing an even pressure from within. It will be understood that any suitable compound is placed between the surfaces to be jointed in the usual way. When the joint has been made, the mandrel is allowed to contract, as it will do by reason of its resiliency when the nut $C^3$ is loosened (or the screw C, as the case may be), and the tube is then undoubled leaving the joint, if made in the manner described, as the usual lapped joint. The jointed pneumatic tube is removed from the mandrel through the gaps in the mandrel tubes.

In the further modified construction of tool shown in Fig. 6, the expansion of a single mandrel tube $A^7$ is brought about by means of a long pinion H meshing with an internally toothed curved rack J. The pinion H has smooth reduced end portions shown as carried in suitable bearings on the tube $A^7$, one of these ends projecting beyond its bearings, as shown, and being provided with a pinion-actuating handle-wheel $H^1$. The adjacent end of the rack J is arranged to push against a suitable abutment on the mandrel tube $A^7$, shown as a turned down edge $A^5$ of such tube, so that when the pinion H is rotated in the proper direction the movement of the rack J expands the mandrel tube $A^7$ which is retained in its expanded condition by means of a ratchet K and pawl $K^1$, carried respectively by the pinion H and one of its bearing lugs. On the release of this ratchet mechanism the mandrel tube $A^7$ will, by reason of its resiliency, resume its original contracted condition. In other respects than above noted, the operation of this particular mandrel is similar to that of those hereinbefore described with reference to the other figures of the drawings. In this construction, like those previously described, an outer expansible mandrel tube may be employed, if desired, but instead thereof a shield L is shown as provided to bridge the gap in the mandrel tube A⁷, and this shield should have a free sliding engagement with at least one extremity of the mandrel tube A⁷, but if desired for convenience, may be attached to the other mandrel extremity, by hinging or otherwise. The shield L prevents injury to the rubber tube, similarly to the outer mandrel tube B, hereinbefore described.

It is understood that these various constructions of mandrels are shown and described by way of examples, and that, as broadly claimed herein, the expansion of the non-continuous tubes may be brought about by any suitable means answering the requirement of leaving unobstructed the central aperture in the mandrel, to permit the pneumatic tube to pass through the mandrel.

Although the mandrel has been described as used for making a lapped joint, it will be seen that it is also particularly suitable for making a flush joint when required to do so, as the pressure produced by the mandrel is exerted evenly all around from within the joint.

It is obvious that various modifications may be made in the constructions shown in the drawings and above particularly described within the principle and scope of my invention.

I claim:

1. An instrument for making joints in rubber tubes comprising a non-continuous annular expansible member which may be inserted in the annular space within the ends of the tube to exert outward pressure on the joint and removed from said space and from the tube when the joint is completed, and expanding means for said annular member laterally-disposed with relation thereto so as to leave unobstructed the central aperture therein.

2. An instrument for making joints in rubber tubes comprising a non-continuous annular expansible member which may be inserted in the annular space within the ends of the tube to exert outward pressure on the joint and removed from said space and from the tube when the joint is completed, and expanding means for said annular member laterally-disposed with relation thereto so as to leave unobstructed the central aperture therein, such means including a rotative manually actuatable handle part located at the end of said annular member.

3. An instrument for making joints in rubber tubes comprising a non-continuous annular expansible member which may be inserted in the annular space within the ends of the tube to exert outward pressure on the joint and removed from said space and from the tube when the joint is completed, and expanding means for said annular member laterally-disposed with relation thereto so as to leave unobstructed the central aperture therein, such means including a toggle coöperative with such member, and means for actuating the toggle.

4. An instrument for making joints in rubber tubes comprising a non-continuous annular expansible member which may be inserted in the annular space within the ends of the tube to exert outward pressure on the joint and removed from said space and from the tube when the joint is completed, and expanding means for said annular member laterally-disposed with relation thereto so as to leave unobstructed the central aperture therein, such means including a spreading device, and means for actuating such device.

5. An instrument for making joints in rubber tubes comprising a non-continuous annular expansible member which may be inserted in the annular space within the ends of the tube to exert outward pressure on the joint and removed from said space and from the tube when the joint is completed, and expanding means for said annular member laterally-disposed with relation thereto so as to leave unobstructed the central aperture therein, such means including a spreading device, and a screw for actuating such device.

6. An instrument for making joints in rubber tubes comprising a non-continuous annular expansible member which may be inserted in the annular space within the ends of the tube to exert outward pressure on the joint and removed from said space and from the tube when the joint is completed, and expanding means for said annular member laterally-disposed with relation thereto so as to leave unobstructed the central aperture therein, such means including a combined screw and toggle mechanism.

7. An instrument for making joints in rubber tubes comprising, in combination, an inner expansible split annulus, an outer expansible split annulus circumferentially surrounding the inner annulus, the annuli being adapted to be arranged so that each covers the split in the other, and expanding means for the inner annulus.

8. An instrument for making joints in rubber tubes comprising, in combination, an inner expansible split annulus, an outer expansible split annulus circumferentially surrounding the inner annulus, the annuli being adapted to be arranged so that each covers the split in the other, and expanding means for the inner annulus, such means including a combined screw and toggle mechanism.

9. An instrument for making joints in rubber tubes comprising, in combination, an inner expansible split annulus, an outer expansible split annulus circumferentially surrounding the inner annulus, the annuli being adapted to be arranged so that each covers the split in the other, and expanding means for the inner annulus, such means including a plurality of toggles bridging the gap at the split in the inner annulus, and a screw-threaded actuating rod for the toggles.

10. An instrument for making joints in rubber tubes comprising, in combination, an inner expansible split annulus, an outer expansible split annulus circumferentially surrounding the inner annulus, the annuli being adapted to be arranged so that each covers the split in the other, and expanding means for the inner annulus, such means including a toggle bridging the gap at the split in the inner annulus, a longitudinally-movable actuating rod for the toggle, and actuating means for such rod.

In testimony whereof I have signed my name to this specification in the presence of two subscribing witnesses.

WALTER HENRY WELCH.

Witnesses:
 RICH. CASTLE,
 E. M. TOLERTON.

Copies of this patent may be obtained for five cents each, by addressing the "Commissioner of Patents, Washington, D. C."